United States Patent [19]
Murphy et al.

[11] Patent Number: 6,040,357
[45] Date of Patent: Mar. 21, 2000

[54] METHOD OF MAKING A RADIATION-CURABLE INK COMPOSITION, RADIATION-CURABLE INK COMPOSITION AND RIBBON ASSEMBLY

[75] Inventors: Edward J. Murphy, Arlington Heights, Ill.; Jeffrey Classey, Denver, N.C.; David M. Szum, Elmhurst, Ill.

[73] Assignee: DSM N.V., Heerlen, Netherlands

[21] Appl. No.: 09/084,918

[22] Filed: May 28, 1998

[51] Int. Cl.$^7$ .......................... C09D 11/00; C09D 11/02; C03C 17/34; G02B 6/04; G02B 1/12

[52] U.S. Cl. .............................. 523/160; 522/75; 522/78; 522/81; 522/83; 385/114; 385/123

[58] Field of Search ........................ 523/160; 106/31.6, 106/31.65; 522/75, 78, 81, 83; 385/114, 123

[56] References Cited

U.S. PATENT DOCUMENTS

| | | | |
|---|---|---|---|
| 4,228,438 | 10/1980 | Vazirani | 347/102 |
| 4,496,210 | 1/1985 | Ansel . | |
| 4,525,026 | 6/1985 | Elion | 385/141 |
| 4,624,994 | 11/1986 | Ansel . | |
| 4,629,285 | 12/1986 | Carter . | |
| 4,660,927 | 4/1987 | Kondow . | |
| 4,682,851 | 7/1987 | Ansel . | |
| 4,740,055 | 4/1988 | Kanda et al. | 385/141 |
| 4,782,129 | 11/1988 | Moschovis . | |
| 4,794,133 | 12/1988 | Moschovis . | |
| 4,806,574 | 2/1989 | Krajewski . | |
| 4,844,604 | 7/1989 | Bishop . | |
| 4,849,462 | 7/1989 | Bishop . | |
| 4,900,126 | 2/1990 | Jackson . | |
| 4,906,067 | 3/1990 | Mayr . | |
| 4,953,945 | 9/1990 | Nishimura . | |
| 5,011,260 | 4/1991 | Marx . | |
| 5,074,643 | 12/1991 | Petisce | 385/128 |
| 5,219,896 | 6/1993 | Coady . | |
| 5,259,060 | 11/1993 | Edward . | |
| 5,336,563 | 8/1994 | Coady . | |
| 5,373,578 | 12/1994 | Parker . | |
| 5,377,292 | 12/1994 | Bartling . | |
| 5,524,164 | 6/1996 | Hattori . | |
| 5,527,835 | 6/1996 | Shustack . | |
| 5,561,730 | 10/1996 | Lochkovic . | |
| 5,621,838 | 4/1997 | Nomura . | |
| 5,847,021 | 12/1998 | Tortorello et al. | 522/90 |
| 5,881,194 | 3/1999 | Duecker | 385/115 |

FOREIGN PATENT DOCUMENTS

| | | |
|---|---|---|
| 0194 891 A1 | 9/1986 | European Pat. Off. . |
| 0 262 340 A2 | 4/1988 | European Pat. Off. . |
| 0 345 968 A2 | 12/1989 | European Pat. Off. . |
| 0 407 004 A2 | 1/1991 | European Pat. Off. . |
| 0 527 266 A1 | 2/1993 | European Pat. Off. . |
| 0 614 099 A2 | 9/1994 | European Pat. Off. . |
| 0 699 933 A2 | 6/1996 | European Pat. Off. . |
| 0 753 777 A2 | 1/1997 | European Pat. Off. . |
| 0 780 712 A2 | 6/1997 | European Pat. Off. . |
| 2 672 699 A1 | 8/1992 | France . |
| 62-177159 | 1/1989 | Japan . |
| 62-311609 | 6/1989 | Japan . |
| H3-35210 | 2/1991 | Japan . |
| WO 90/13579 A1 | 11/1990 | WIPO . |
| WO 97/18493 A1 | 5/1997 | WIPO . |
| WO 97/19029 A1 | 5/1997 | WIPO . |

OTHER PUBLICATIONS

Koleske, *Paint and Coating Testing Manual*, 14$^{th}$ Ed., pp. 160–167, and 509–510, 1995.

K.W. Jackson, et. al., "The Effect of Fiber Ribbon Component Materials on Mechanical and Environmental Performance", 28 International Wire & Symposium Proceedings (1993).

H.C. Chandon, et. al., "Fiber Protective Design for Evolving Telecommunication Applications", International Wire & Symposium Proceedings (1992).

J.R. Toler, et. al., "Factors Affecting Mechanical Stripping of Polymer Coatings From Optical Fibers", International Wire & Cable Symposium Proceedings (1989).

W. Griffioen, "Strippability of Optical Fibers", EFOC & N, Eleventh Annual Conference, Hague (1993).

*Primary Examiner*—Vasu Jagannathan
*Assistant Examiner*—Callie E. Shosho
*Attorney, Agent, or Firm*—Jeffrey S. Melcher; Farkas & Manelli, PLLC

[57] ABSTRACT

Provided is radiation-curable ink composition containing a radiation-curable carrier system containing at least one radiation-curable monomer or oligomer and at least one pigment dispersed in the radiation-curable carrier system in an amount sufficient to provide a color which is visible without magnification. The pigment is substantially insoluble in the radiation-curable carrier system whereby the particulate shape of the pigment is substantially retained in the radiation-curable carrier system. The pigment having a particle size that substantially avoids pigment induced microbending of an optical glass fiber coated with the ink coating.

29 Claims, No Drawings

METHOD OF MAKING A RADIATION-CURABLE INK COMPOSITION, RADIATION-CURABLE INK COMPOSITION AND RIBBON ASSEMBLY

FIELD OF INVENTION

The invention relates to a method for making an improved radiation-curable ink composition, an improved radiation-curable ink composition and a ribbon assembly.

BACKGROUND OF THE INVENTION

Optical glass fibers are usually coated with two superposed radiation-cured coatings, which together form a primary coating. The coating which contacts the glass surface is called the inner primary coating and the overlaying coating is called the outer primary coating.

The inner primary coating is usually a soft coating having a low glass transition temperature (hereinafter "Tg"), to provide resistance to microbending. Microbending can lead to attenuation of the signal transmission capability of the coated optical glass fiber and is therefore undesirable. The outer primary coating is typically a harder coating providing desired resistance to handling forces, such as those encountered when the coated fiber is cabled.

For the purpose of multi-channel transmission, optical glass fiber assemblies containing a plurality of coated optical fibers have been used. Examples of optical glass fiber assemblies include ribbon assemblies and cables. A typical optical glass fiber assembly is made of a plurality of coated optical glass fibers which are bonded together in a matrix material. For example, the matrix material can encase the optical glass fibers, or the matrix material can edge-bond the optical glass fibers together.

Optical glass fiber assemblies provide a modular design which simplifies the construction, installation and maintenance of optical glass fibers by eliminating the need to handle individual optical glass fibers.

Coated optical glass fibers for use in optical glass fiber assemblies are usually coated with an outer colored layer, called an ink coating, or alternatively a colorant is added to the outer primary coating to facilitate identification of the individual coated optical glass fibers. Thus, the Matrix material which binds the coated optical glass fibers together contacts the outer ink layer if present, or the colored outer primary coating.

When a single optical glass fiber of the assembly is to be fusion connected with another optical glass fiber or with a connector, an end part of the matrix layer can be removed to separate each of the optical glass fibers.

Desirably, the primary coatings on the coated optical glass fibers, and the ink coating if present, are removed simultaneously with the matrix material to provide bare portions on the surface of the optical glass fibers (hereinafter referred to as "ribbon stripping"). In ribbon stripping, the matrix material, primary coatings, and ink coating, are desirably removed as a cohesive unit to provide a clean, bare optical glass fiber which is substantially free of residue.

A common method for practicing ribbon stripping at a terminus of the ribbon assembly is to use a heated stripping tool. Such a tool consists of two plates provided with heating means for heating the plates to about 90 to about 120° C. An end section of the ribbon assembly is pinched between the two heated plates and the heat of the tool softens the matrix material and the primary coatings on the individual optical glass fiber. The heat-softened matrix material and heat-softened primary coatings present on the individual optical glass fibers can then be removed to provide bare optical glass fiber ends, at which the fusion connections can be made. A knife cut is often used to initiate a break in the matrix material to the inner primary coating. Typically, only about 1 to 4 cm section of the matrix material and coatings on the optical glass fibers need be removed. Identification of the bare individual optical glass fibers can be made by tracing back along the bare optical fiber until the ink coating or colored outer primary coating is seen.

Ink coatings usually have a thickness of about 3 to about 10 microns and are formed from a pigment dispersed within a UV curable carrier system. The UV curable carrier system contains a UV curable oligomer or monomer that is liquid before curing to facilitate application of the ink composition to the optical glass fiber, and then a solid after being exposed to UV radiation. In this manner, the UV curable ink composition can be applied to a coated optical glass fiber in the same manner as the inner primary and outer primary coatings are applied.

Modern high speed optical glass fiber drawing towers operate at a very high speed. Thus, the ink composition must have a very fast cure speed to ensure complete cure of the ink coating on the high speed drawing tower. However, the increase in cure speed should not come at the expense of other important properties of the ink coating, such as providing suitable break out performance. In addition, ink compositions should not contain ingredients that can migrate to the surface of the optical glass fiber and cause corrosion. The ink composition should also not contain ingredients which can cause instability in the protective coatings or matrix material. Ink coatings for optical glass fibers should be color fast for decades, not cause attenuation of the signal transmission, be impervious to cabling gels and chemicals, and allow sufficient light penetration for fiber core alignment.

From the above, it is clear that optical glass fiber technology places many unique demands on radiation-curable ink compositions which more conventional technologies, such as printing inks, do not.

U.S. Pat. No. 4,629,285 discloses a method for making an ink coating on a coated optical glass fiber in which a UV curable ink is applied to a coated optical glass fiber. The ink coating is applied in a method that preserves the concentricity of the optical glass fibers. The preferred inks are pigmented semi-opaque UV curable polymeric inks. However, the ink compositions disclosed in this patent do not have a sufficiently fast enough cure speed to be used on modern high speed optical glass fiber drawing and coating towers.

Laid open Japanese Patent Application No. H1-152405 discloses a radiation-curable ink composition containing an organic polysiloxane compound. The polysiloxane compound provides the ink coating with the ability to separate more easily from the matrix material in a ribbon assembly.

Published Japanese Patent Application No. 64-22976 discloses radiation-curable ink compositions containing specific radiation-curable oligomers. The ink composition provides an ink coating having adhesion to the outer primary coating which is separable from the matrix material in a ribbon assembly.

Conventional ink coatings can have problems with concentricity. If the ink coating is not concentric, undesirable attenuation of the signal transmission may occur. Thus, there is a need for an ink composition that can be applied to a coated optical glass fiber in a concentric layer.

Ink compositions containing pigments can be very difficult to suitably cure via exposure to actinic radiation. The pigments can cause an undesirable reduction in cure speed. Thus, there is a need for a fast curing ink composition that can be used on high speed modern day optical glass fiber drawing and coating towers.

Ink coatings can have a non-uniform coloring. Therefore, there is a need for an ink composition that is capable of providing an ink coating having a uniform color.

There is also a need for an ink composition that provides an ink coating which is significantly less susceptible to causing microbending in an optical glass fiber that can lead to undesirable attenuation of the signal transmission.

SUMMARY OF THE INVENTION

An objective of the present invention is to provide an improved ink composition which when coated and cured on coated optical glass fibers provides an ink coating having a uniform color and which is significantly less susceptible to causing microbending in the optical glass fiber.

A further objective is to provide a method for making an ink composition which when coated and cured on coated optical glass fibers provides an ink coating having a uniform color and which is significantly less susceptible to causing microbending in the optical glass fiber.

The above objectives and other objects can be obtained by the following. Provided is a novel radiation-curable ink composition which when coated and suitably cured on a coated optical glass fiber provides an ink coating having a substantially uniform color, the improved ink composition comprising:

- a radiation-curable carrier system containing at least one radiation-curable monomer or oligomer; and
- at least one pigment dispersed in the radiation-curable carrier system in an amount sufficient to provide a color which is visible without magnification, the pigment being substantially insoluble in the radiation-curable carrier system whereby the particulate shape of the pigment is substantially retained in the radiation-curable carrier system, and the pigment having a particle size that substantially avoids pigment induced microbending of an optical glass fiber coated with the ink coating.

Also provided is a novel method of making an improved radiation-curable ink composition which when coated and suitably cured on a coated optical glass fiber provides an ink coating having a substantially uniform color, the method comprising the steps of:

- combining a radiation-curable carrier system containing at least one radiation-curable monomer or oligomer with at least one pigment to provide an ink composition, wherein the pigment is present in an amount sufficient to provide a color which is visible without magnification, the pigment being substantially insoluble in the radiation-curable carrier system whereby the particulate shape of the pigment is substantially retained in the radiation-curable carrier system;
- filtering the ink composition to selectively remove pigment particles having a size of about 3 microns or greater to substantially avoid pigment induced microbending of an optical glass fiber coated with the ink coating.

Also provided is a ribbon assembly containing at least one optical glass fiber coated with an ink coating according to the present invention.

DETAILED DESCRIPTION OF PREFERRED EMBODIMENTS

The improved ink composition of this invention can be based on the radiation-curable carrier system of any known ink composition for coating and identifying coated optical glass fibers, which contains monomers or oligomers that are radiation curable. Commercial examples of suitable radiation-curable carriers include the radiation-curable carriers utilized in the Cablelite series of UV curable inks from DSM Desotech Incorporated which are based on multifunctional acrylate monomers.

Ink coatings are usually about 3 to about 10 microns thick and are usually concentric to prevent attenuation of the signal transmission. However, if desired, the ink coating can be applied in any form suitable to provide visible color identification of the individual coated optical glass fibers. Examples of suitable coatings include dashes, dots, lines, and rings. Preferably, the ink coating is substantially concentric. The ink coating compositions according to the present invention are capable of providing substantially concentric ink coatings, as well as discontinuous coatings such as dashes, dots, lines, and rings.

The ink coatings generally have a Tg of at least about 30° C., more preferably at least about 50° C. One of ordinary skill in the art of formulating radiation-curable ink compositions knows how to adjust the radiation-curable composition to provide the desired properties of the cured coating. Thus, radiation-curable compositions which are usually used for forming outer primary coating compositions can be reformulated and utilized as the radiation-curable carrier system in the ink composition according to the present invention. Examples of suitable radiation-curable compositions which may be reformulated variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Radiation-curable carriers which are suitable for forming the present ink composition contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, -vinyl amide, maleate esters, and fumarate esters. Preferably, the ethylenic unsaturation is provided by a group containing acrylate, methacrylate, or styrene functionality.

Another type of functionality generally used is provided by, for example, epoxy groups, or thiol-ene or amine-ene systems. Epoxy groups in can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

Preferably, at least about 80 mole %, more preferably, at least about 90%, and most preferably substantially all of the radiation-curable functional groups present in the oligomer are acrylate or methacrylate.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. Examples of suitable carbon-containing backbones include polyethers, polyolefins, polyesters, polyamides, and polycarbonates. The size of the carbon-containing backbone can be selected to provide the desired molecular weight. The number average molecular weight of the oligomer is usually between about 500 to about 10,000, preferably between about 500 to about 7,000, and most preferably between about 1,000 to about 5,000.

For example, the carbon-containing backbone of the oligomer can comprise aromatic groups and ring-opened epoxy groups or alkoxy groups. The oligomer can be represented by, for example:

R-Ar-R; or

R-L-Ar-L-R where r is a radiation-curable functional group,

Ar is an aromatic group containing moiety, and

L is a linking group.

Examples of suitable linking groups include alkoxy or ring opened epoxy such as ethoxy, propoxy, butoxy, and repeat units thereof. L can also be a urethane or urea linking group.

The aromatic groups can be, for example, derived from bisphenol units, such as bisphenol A. A preferred oligomer is a diglycidyl ether derivative of bisphenol A to which acrylate functional groups have been bound. A commercially available example of such an oligomer is CN-120 (Sartomer), which has a molecular weight of about 1300, and when cured has a Tg of about 65° C.

Another example of a preferred oligomer is a trifunctional polyether or polyester having a molecular weight of about 500 to about 5000. A preferred example of a trifunctional oligomer is the commercially available polyurethane triacrylate Ebecryl 264, which has a molecular weight of about 2000 and when cured a Tg of about 42° C.

The radiation-curable carrier systems may also contain a reactive diluent which is used to adjust the viscosity. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4-C_{20}$ alkyl or polyether moiety. Particular examples of such reactive diluents include:

hexylacrylate, 2-ethylhexylacrylate, isobornylacrylate, decyl-acrylate, laurylacrylate, stearylacrylate, 2-ethoxyethoxy-ethylacrylate, laurylvinylether, 2-ethylhexylvinyl ether, N-vinyl formamide, isodecyl acrylate, isooctyl acrylate, vinyl-caprolactam, N-vinylpyrrolidone, and the like.

Another type of reactive diluent that can be used is a compound having an aromatic group. Particular examples of reactive diluents having an aromatic group include: ethyleneglycolphenylether-acrylate, polyethyleneglycol phenyletheracrylate, polypropyleneglycolphenylether-acrylate, and alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:

$C_2-C_{18}$ hydrocarbon-dioldiacrylates, $C_4-C_{18}$ hydrocarbondivinylethers, $C_3-C_{18}$ hydrocarbon triacrylates, and the polyether analogues thereof, and the like, such as 1,6-hexanedioldiacrylate, trimethylolpropanetri-acrylate, hexanedioldivinylether, triethylene-glycoldiacrylate, pentaerythritol-triacrylate, ethoxylated bisphenol-A diacrylate, and tripropyleneglycol diacrylate.

If the radiation-curable functional group of the radiation-curable monomer or oligomer is an epoxy group, for example, one or more of the following compounds can be used as the reactive diluent:

epoxy-cyclohexane, phenylepoxyethane, 1,2-epoxy-4-vinylcyclohexane, glycidylacrylate, 1,2-epoxy-4-epoxyethyl-cyclohexane, diglycidylether of polyethylene-glycol, diglycidylether of bisphenol-A, and the like.

If the radiation-curable functional group of the radiation-curable monomer or oligomer has an amine-ene or thiol-ene system, examples of reactive diluents having allylic unsaturation that can be used include:

diallylphthalate, triallyltri-mellitate, triallylcyanurate, triallylisocyanurate, and diallylisophthalate.

For amine-ene systems, amine functional diluents that can be used include, for example:

the adduct of trimethylolpropane, isophorondiisocyanate and di(m)ethylethanolamine, the adduct of hexanediol, isophoron-diisocyanate and dipropylethanolamine, and the adduct of trimethylol propane, trimethylhexamethylenediisocyanate and di(m)ethylethanolamine.

Other additives which can be used in the ink coating composition include, but are not limited to, photoinitiators, catalysts, lubricants, wetting agents, antioxidants and stabilizers. The selection and use of such additives is within the skill of the art.

Furthermore, the ink composition can contain at least one additive component which facilitates breakout performance. For example, the additive can be a hydrophobic polymer or oligomer, such as a silicone compound or a radiation-curable silicone compound. The amount of this additive can be that which is effective to retain suitable adhesion of the ink coating to the coated optical glass fiber but which provides suitable breakout characteristics between the ink coating and the matrix material of a ribbon assembly.

Conventional inorganic and organic pigments which have been processed in accordance with the present invention can be used to formulate the improved radiation-curable ink composition according to the present invention. The use of the term "pigment" refers to both inorganic and organic pigments. The pigments are substantially insoluble in the radiation-curable carrier system whereby the particle shape of pigment is substantially retained in the ink composition. Soluble pigments can be combined with the insoluble pigments if desired. However, use of soluble pigments is not preferred because they can undesirably affect the properties of the ink coating. Therefore, preferably the ink composition is substantially free-of pigments which are substantially soluble in the radiation-curable carrier system.

Ink compositions for application on a glass optical glass fiber drawing tower usually must pass through a die for applying the ink composition to the coated optical glass fiber. The die has a diameter which provides the desired thickness of the ink coating to be applied to the coated optical glass fiber. For example, if an ink coating having a thickness of 5 microns is desired, the diameter of the die should be 10 microns greater than the diameter of the coated optical glass fiber passing through the die. It has been found that pigment particles having a size greater than the thickness of the ink coating being applied to the coated optical glass fiber have been able to pass through the die. It is believed that the fiber is displaced off center as the pigment particle passes through the die. In some cases, instead of passing through the die, the pigment particle may be sheared or may clog the die causing undesirable streaks in the ink coating.

It has now been found that pigment particles having a size greater than the thickness of the ink coating can cause microbending in the optical glass fiber which can lead to undesirable attenuation of the signal transmission through the optical glass fiber. It is believed that when a matrix material is applied to the coated optical glass fiber for forming a ribbon assembly, the matrix material exerts a force on the pigment particle. This force can be transmitted through the pigment particle and protective coatings to the surface of the optical glass fiber, thereby causing microbending in the optical glass fiber.

Based on experimentation, it is has been found that the ink composition should be formulated to provide as few pigment particles as possible having a size of at least the thickness of the ink coating to avoid pigment particle induced microbending. In general, it is believed that the degree of pigment particle induced microbending increases as the amount of pigment particles having a size of at least the thickness of the ink coating increases. Suitable amounts of pigment particles having a size equal to or greater than the thickness of the ink coating have been found to be about 230 or less, preferably about 200 or less, more preferably about 150 or less, and most preferably about 100 or less pigment particles per square centimeter of ink coating. Thus, for ink coatings having a thickness of about 3 to about 10 microns, the quantity of pigment particles having a size of about 3 microns and greater should be about 230 or less, preferably about 200 or less, more preferably about 150 or less, and most preferably about 100 or less per square centimeter of ink coating.

The pigment particles in the ink coating preferably have a number average mean particle diameter of about 0.8 microns or less, more preferably from about 0.1 to about 0.8 microns.

In general, pigment manufacturers can manufacture pigments having the desired particle size according to the request of customers. However, such pigments are usually produced for use in a wide variety of applications in which pigment induced microbending is not a factor. Therefore, these pigments generally contain an undesirable number of particles having a size of 3 microns or greater. To reduce the number of undesirable particles, the pigment can be suitably dispersed in at least a portion of the desired amount of radiation-curable carrier and then processed according to the present invention to provide the desired particle size. The ink composition can be processed according to the present invention by subjecting the ink composition to a filtering process to selectively remove undesirable pigment particles, such as those particles having a size of at least about the desired ink coating thickness. For example, if the ink composition is to be applied at a thickness of about 3 to about 10 microns, pigment particles having a size of about 3 microns and greater can be selectively removed via filtering to the extent that about 230 or less, preferably about 200 or less, more preferably about 150 or less, and most preferably about 100 or less per square centimeter remain.

The filtering process can be carried out by passing the ink composition through a suitable filter under prevailing atmospheric pressure or at increased pressures. The use of filters is now well known in the art. Based on the disclosure provided herein, the selection of the filter should be such that undesirable pigment particles having a size of about 3 microns and greater are selectively removed to substantially reduce pigment particle induced microbending in ribbon assemblies. However, significant amounts of pigment particles having a size below about 3 microns should not be removed to avoid color degradation.

If desired, the pigment can be suitably dispersed in one or more of the components of the radiation-curable carrier system and then processed. The remaining components of the radiation-curable carrier system can then be combined with the processed pigment. For example, to facilitate quicker and simpler filtering, the pigment can be suitably dispersed in a low viscosity diluent and then subjected to processing. After which, the remaining components, such as oligomers or monomers, can be combined with the processed pigment to form the ink composition.

Ribbon assemblies utilizing 12 or less coated optical glass fibers require only 12 colors to adequately distinguish each of the coated optical fibers from one another. However, in larger ribbon assemblies, more than 12 colors may be utilized to adequately distinguish the coated optical glass fibers from one another. Any color may be used in the ink composition according to the present invention. Examples of twelve colors normally used for making ribbon assemblies include: black, white, yellow, blue, red, green, orange, brown, pink, aqua, violet, and gray.

A specific example of a suitable black pigment includes carbon black.

A specific example of a suitable white pigment includes titanium dioxide.

Specific examples of suitable yellow pigments include diarylide yellow and diazo based pigments.

Specific examples of suitable blue pigments include phthalocyanine blue, basic dye pigments, and phthalocyanines.

Specific examples of suitable red pigments include anthraquinone (red), napthole red, monoazo based pigments, quinacridone pigments, anthraquinone, and perylenes.

Specific examples of suitable green pigments include phthalocyanine green and nitroso based pigments.

Specific examples of suitable orange pigments include monoazo and diazo based pigments, quinacridone pigments, anthraquinones and perylenes.

Specific examples of suitable violet pigments include quinacrinode violet, basic dye pigments and carbazole dioxazine based pigments.

Suitable aqua, brown, gray, and pink pigments can easily be formulated by combining other colors. One skilled in the art is able to form any color as desired by combining different.

The pigment can be present in the ink composition in an amount that provides coloration that is visible without magnification to facilitate identification of the individual colored optical glass fiber. The amount of the pigment should not be so great as to significantly reduce the cure speed of the ink composition or result in other undesirable affects. Examples of suitable amounts of pigment have been found to be from about 1 to about 20 weight %, preferably about 1 to about 15 weight %, more preferably about 1 to about 10 weight %, based on the total weight of the ink composition.

A suitable ink composition comprises:
- about 1 to about 20 weight % of at least one pigment, wherein the quantity of pigment particles having a size of about 3 microns or greater is about 230 or less per square centimeter of ink coating; and
- about 80 to about 99% of a radiation-curable carrier system.

A preferred ink composition comprises:
- about 1 to about 20 weight % of at least one pigment, wherein the quantity of pigment particles having a size of about 3 microns or greater is about 200 or less per square centimeter of ink coating;
- about 20 to about 80 weight % of at least one radiation-curable oligomer;
- about 5 to about 80 weight % of at least one radiation-curable diluent monomer; and
- about 0.1 to about 10 weight % of at least one photoinitiator, based on the total weight % of the ink composition.

The ink coating composition can be applied to the coated optical glass and cured using any suitable method. An example of a suitable method is disclosed in U.S. Pat. No. 4,629,285, the complete disclosure of which is incorporated herein by reference. The ink composition can also be applied in a manner similar to the application of the outer primary coating on an optical glass fiber drawing and coating tower.

Ribbon assemblies are now well known in the art and one skilled in the art will easily be able to use the disclosure provided herein to prepare a novel ribbon assembly containing at least one of the improved ink coated optical glass fibers for the desired applications. The novel ribbon assembly made according to this invention can be used in telecommunication systems. Such telecommunication systems typically include ribbon assemblies containing optical glass fibers, transmitters, receivers, and switches. The ribbon assembly containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assembly containing the coated optical glass fibers are the fundamental connecting units of such cable television systems. The ribbon assembly can be buried under ground or water for long distance connections, such as between cities. The ribbon assembly can also be used to connect directly to residential homes.

The invention will be further explained by the following non-limiting examples.

EXAMPLES AND COMPARATIVE EXAMPLES

Commercially available inks were filtered using the following three different filter units: (1) Millipore CRO1 filter, (2) Millipore CRO1 filter in series with a Pall Ultipleat 4.5 and (3) CRK3 filter. The quantity of pigment particles in each sample having a size of 3 microns and greater was then determined as follows.

3 inch by 1 inch microscope slides were cleaned using ethanol and lint free cotton wipes. Three 0.011 gram (+/- 0.003 grams) samples of each filtered ink were taken using glass capillary droppers and applied to the cleaned slides. A cover slip was placed over each sample and pressure was applied to edges of the cover slip to provide samples having a diameter between 9 and 12 mm. The thickness of the sample coating being tested is usually from about 40 to about 80 microns thick, depending upon the viscosity of the ink coating composition and the pressure applied to the cover slip. The samples were covered prior to exposure to UV light to prevent curing by the overhead lighting. Each sample was then cured by exposure to a 1.0 J/cm$^2$ dose of UV light from a fusion D Lamp under a nitrogen atmosphere.

The number of particles having a size of 3 microns or greater per square centimeter for each sample was determined using ASTM E20-85 and ASTM D1366-86, as follows. A sample area of 4 mm$^2$ was sectioned off using a pen for viewing under a microscope. The microscope was calibrated within 24 hours of preparing the slides, as described below. A file containing a photograph of a ruler was retrieved and the units were set to microns. A line was made from the first large slash mark to the last large slash mark, which equals 100 microns. The sample slides were examined under 400× magnification. Each slide was scanned to locate one corner of the marked off area in which to begin counting. Particles having a size of 3 microns and greater were counted. Once a particle was identified, a photograph of the image was captured on the computer. A line was made from end to end of the particle and measured. Examination of the slide for particles was kept within the square of 4 mm$^2$. Each sample area of 4 mm$^2$ was divided into 12 computer monitor screens per row and 12 computer monitor screens per column. If the particle count exceeded 10 particles per computer monitor screen, a particle count was done on only one screen and multiplied by 144 screens to arrive at the number of particles per 4 mm$^2$. If the particle count exceeded 10 particles per column or per row, a particle count was only done on the row or column and multiplied by 12 to arrive at the number of particles per 4 mm$^2$. The average number of particles for the three samples was determined and then converted to average number of particles per cm$^2$. The results are shown in Table 1.

The microscope was calibrated as follows. A micrometer from American Optical Company having a length of 2 mm, divided into units of 0.01 mm (10 microns) was imaged by the microscope using the 40× objective. This image was received by the video camera and sent to the video monitor. The image on the video monitor was then transferred to the computer using the digital imaging system and was viewed on the computer monitor. A section of this image equal to 200 microns on the micrometer is utilized for the purpose of spatial calibration in the computer imaging system. The software (Optimas) provides a cue for a new calibration, at which point a straight line is drawn with a mouse across the section of the micrometer image being used for the calibration. The software then asks for the length of this line. Since the micrometer is 200 microns, the length of 200 microns is inputted into the computer. This information provides the basis for the software to make size determinations of particles or other objects imaged by the microscope.

Once the software has been calibrated, an image of the system of interest is sent to the computer from the microscope. Once any particles or objects are identified and selected for measurement, a line is drawn across the object using the mouse. Based upon the spatial calibration information which the software has in memory, the distance of the line, and therefore the size of the object, is displayed on the monitor. The calibration of the software was conducted every time the software was re-opened, and the microscope objective used for the calibration and the subsequent particle measure were the same.

TABLE 1

| Ink | | Control | CRO1 | Ultipleat | CRK3 |
|---|---|---|---|---|---|
| Green | Ave. No. Part. ≧3 µ/cm² | 392 | 642 | 25 | 0 |
| | Ave. No. Part. ≧3 µ sample | 15.67 | 25.67 | 1.00 | 0 |
| Aqua | Ave. No. Part. ≧3 µ/cm² | 233 | 258 | 125 | 0 |
| | Ave. No. Part. ≧3 µ sample | 9.33 | 10.33 | 5.00 | 0 |
| Blue | Ave. No. Part. ≧3 µ/cm² | 1,267 | 1,833 | 200 | 17 |
| | Ave. No. Part. ≧3 µ sample | 50.67 | 73.33 | 8.00 | 0.67 |
| Violet | Ave. No. Part. ≧3 µ/cm² | 12,700 | 708 | 8 | 8 |
| | Ave. No. Part. ≧3 µ sample | 508.00 | 28.33 | 0.33 | 0.33 |
| Brown | Ave. No. Part. ≧3 µ/cm² | 182,400 | 12,500 | 75 | 67 |
| | Ave. No. Part. ≧3 µ sample | 7,296.00 | 500.00 | 3.00 | 2.67 |
| Red | Ave. No. Part. ≧3 µ/cm² | 5,600 | 267 | 58 | 8 |
| | Ave. No. Part. ≧3 µ sample | 224.00 | 10.67 | 2.33 | 0.33 |

Since the ink coating thickness used to generate the test results shown in Table 1 were significantly greater than the usual thickness of an ink coating on an optical glass fiber, the number of pigment particles per square centimeter having a size greater than 3 microns should be significantly less for the examples when measured at the usual ink coating thickness of 3 to 10 microns.

While the invention has been described in detail and with reference to specific embodiments thereof, it will be apparent to those of ordinary skill in the art that various changes and modifications can be made to the claimed invention without departing from the spirit and scope thereof.

We claim:

1. An improved radiation-curable ink composition which when coated and suitably cured on a coated optical glass fiber provides an ink coating having a substantially uniform color, the improved ink composition comprising:
   a radiation-curable carrier system containing at least one radiation-curable monomer or oligomer; and
   at least one pigment dispersed in said radiation-curable carrier system in an amount sufficient to provide a color which is visible without magnification, said pigment being substantially insoluble in said radiation-curable carrier system whereby the particulate shape of said pigment is substantially retained in said radiation-curable carrier system, and said pigment having a particle size which substantially avoids pigment induced microbending of an optical glass fiber coated with said ink coating.

2. A radiation-curable ink composition according to claim 1, wherein said pigment having a number average mean particle diameter of less than about 0.8 microns.

3. A radiation-curable ink composition according to claim 1, wherein said pigment contains about 230 or less particles having a size of about 3 microns or greater per one square centimeter of cured ink coating at a coating thickness from about 3 to about 10 microns.

4. A radiation-curable ink composition according to claim 3, wherein said ink composition comprises from about 1 to about 20 weight % of said pigment and about 80 to about 90 weight % of a radiation-curable carrier system.

5. A radiation-curable ink composition according to claim 1, wherein said pigment contains about 200 or less particles having a size of about 3 microns or greater per one square centimeter of cured ink coating at a coating thickness from about 3 to about 10 microns.

6. A radiation-curable ink composition according to claim 5, wherein said ink composition comprises from about 1 to about 20 weight % of said pigment and about 80 to about 90 weight % of a radiation-curable carrier system.

7. A radiation-curable ink composition according to claim 1, wherein said pigment contains about 150 or less particles having a size of about 3 microns or greater per one square centimeter of cured ink coating at a coating thickness from about 3 to about 10 microns.

8. A radiation-curable ink composition according to claim 7, wherein said ink composition comprises from about 1 to about 20 weight % of said pigment and about 80 to about 90 weight % of a radiation-curable carrier system.

9. A radiation-curable ink composition according to claim 1, wherein said pigment contains about 100 or less particles having a size of about 3 microns or greater per one square centimeter of cured ink coating at a coating thickness from about 3 to about 10 microns.

10. A radiation-curable ink composition according to claim 9, wherein said ink composition comprises from about 1 to about 20 weight % of said pigment and about 80 to about 90 weight % of a radiation-curable carrier system.

11. A radiation-curable ink composition according to claim 1, wherein said ink composition comprises from about 1 to about 20 weight % of said pigment and about 80 to about 90 weight % of a radiation-curable carrier system.

12. A radiation-curable ink composition according to claim 1, wherein said ink composition is adapted to provide a substantially concentric ink coating on a coated optical glass fiber.

13. An improved radiation-curable ink composition which when coated and suitably cured on a coated optical glass fiber provides an ink coating having a substantially uniform color, the improved ink composition comprising:
   a radiation-curable carrier system containing at least one radiation-curable monomer or oligomer; and at least one pigment dispersed in said radiation-curable carrier system in an amount sufficient to provide a color which is visible without magnification, said pigment being substantially insoluble in said radiation-curable carrier system whereby the particulate shape of said pigment is substantially retained in said radiation-curable carrier system, and said pigment contains about 230 or less particles having a size of about 3 microns or greater per one square centimeter of cured ink coating at a coating thickness from about 3 to about 10 microns.

14. A radiation-curable ink composition according to claim 13, wherein said pigment contains about 200 or less particles having a size of about 3 microns or greater per one square centimeter of cured ink coating at a coating thickness from about 3 to about 10 microns.

15. A radiation-curable ink composition according to claim 14, wherein said ink composition comprises from about 1 to about 20 weight % of said pigment and about 80 to about 90 weight % of a radiation-curable carrier system.

16. A radiation-curable ink composition according to claim 13, wherein said pigment contains about 150 or less particles having a size of about 3 microns or greater per one square centimeter of cured ink coating at a coating thickness from about 3 to about 10 microns.

17. A radiation-curable ink composition according to claim 16, wherein said ink composition comprises from about 1 to about 20 weight % of said pigment and about 80 to about 90 weight % of a radiation-curable carrier system.

18. A radiation-curable ink composition according to claim 13, wherein said pigment contains about 100 or less particles having a size of about 3 microns or greater per one square centimeter of cured ink coating at a coating thickness from about 3 to about 10 microns.

19. A radiation-curable ink composition according to claim 18, wherein said ink composition comprises from about 1 to about 20 weight % of said pigment and about 80 to about 90 weight % of a radiation-curable carrier system.

20. A radiation-curable ink composition according to claim 13, wherein said ink composition comprises from about 1 to about 20 weight % of said pigment and about 80 to about 90 weight % of a radiation-curable carrier system.

21. A radiation-curable ink composition according to claim 20, wherein said ink composition comprises from about 1 to about 20 weight % of said pigment and about 80 to about 90 weight % of a radiation-curable carrier system.

22. A radiation-curable composition according to claim 13, wherein said ink composition is adapted to provide a substantially concentric ink coating on a coated optical glass fiber.

23. A method of making an improved radiation-curable ink composition which when coated and suitably cured on a coated optical glass fiber provides an ink coating having a substantially uniform color, the method comprising the steps of:
combining a radiation-curable carrier system containing at least one radiation-curable monomer or oligomer with at least one pigment to provide an ink composition, wherein said pigment is present in an amount sufficient to provide a color which is visible without magnification, said pigment being substantially insoluble in said radiation-curable carrier system whereby the particulate shape of said pigment is substantially retained in said radiation-curable carrier system;
filtering said ink composition to selectively remove pigment particles having a size of about 3 microns or greater to substantially avoid pigment induced microbending of an optical glass fiber coated with said ink coating.

24. A method according to claim 23, wherein said filtering step is conducted to provide said pigment with about 230 or less particles having a size of about 3 microns or greater per one square centimeter of cured ink coating at a coating thickness from about 3 to about 10 microns.

25. A method according to claim 23, wherein said filtering step is conducted to provide said pigment with about 200 or less particles having a size of about 3 microns or greater per one square centimeter of cured ink coating at a coating thickness from about 3 to about 10 microns.

26. A method according to claim 23, wherein said filtering step is conducted to provide said pigment with about 150 or less particles having a size of about 3 microns or greater per one square centimeter of cured ink coating at a coating thickness from about 3 to about 10 microns.

27. A method according to claim 23, wherein said filtering step is conducted to provide said pigment with about 100 or less particles having a size of about 3 microns or greater per one square centimeter of cured ink coating at a coating thickness from about 3 to about 10 microns.

28. A method of making an improved radiation-curable ink composition which when coated and suitably cured on a coated optical glass fiber provides an ink coating having a substantially uniform color, the method comprising the steps of:
combining at least one pigment with at least one monomer or oligomer component of a radiation-curable carrier system to form a colored mixture;
filtering said colored mixture to selectively remove pigment particles having a size of about 3 microns or greater; and
combining said filtered colored mixture with remaining components of said radiation-curable carrier system to form a radiation-curable ink coating composition which substantially avoids pigment induced microbending of an optical glass fiber coated with said ink coating.

29. A ribbon assembly comprising a plurality of coated optical glass fibers bound together with a matrix material, wherein at least one of said coated optical glass fibers comprising:
an optical glass fiber;
an inner primary coating adjacent to said optical glass fiber;
an outer primary coating adjacent to said inner primary coating; and
an ink coating adjacent to said outer primary coating; wherein said ink coating is formulated from an ink coating composition comprising:
a radiation-curable carrier system containing at least one radiation-curable monomer or oligomer; and
at least one pigment dispersed in said radiation-curable carrier system in an amount sufficient to provide a color which is visible without magnification, said pigment being substantially insoluble in said radiation-curable carrier system whereby the particulate shape of said pigment is substantially retained in said radiation-curable carrier system, and said pigment having a particle size that substantially avoids pigment induced microbending of an optical glass fiber coated with said ink coating.

* * * * *